United States Patent
Coenen

[11] Patent Number: 6,124,658
[45] Date of Patent: Sep. 26, 2000

[54] BEARING ASSEMBLY FOR AN OPEN-END SPINNING MACHINE

[75] Inventor: Norbert Coenen, Mönchengladbach, Germany

[73] Assignee: W. Schlafhorst AG & Co., Germany

[21] Appl. No.: 09/330,123

[22] Filed: Jun. 10, 1999

[30] Foreign Application Priority Data

Jun. 20, 1998 [DE] Germany ............................ 198 27 606

[51] Int. Cl.⁷ .................................................. D01H 4/12
[52] U.S. Cl. ............................................. 310/90.5; 310/90
[58] Field of Search ....................... 310/90.5, 90; 57/406, 57/404, 400; 340/682, 648, 652

[56] References Cited

U.S. PATENT DOCUMENTS

| | | | |
|---|---|---|---|
| 3,221,389 | 12/1965 | Cowell | 310/90.5 |
| 3,860,300 | 1/1975 | Lyman | 310/90.5 |
| 5,622,040 | 4/1997 | Preutenborbeck et al. | 57/406 |

FOREIGN PATENT DOCUMENTS

| | | | |
|---|---|---|---|
| 05 21 08 590 | 7/1972 | Germany | B04B 7/00 |
| 28 33 893 | 2/1979 | Germany | F16C 32/04 |
| 76 11 594 U1 | 6/1979 | Germany | D01H 7/12 |
| 43 42 583 A1 | 6/1995 | Germany | D01H 4/10 |
| 44 27 153 A1 | 2/1996 | Germany | F04D 29/04 |
| 25 24 061 A1 | 12/1996 | Germany | F04D 14/04 |
| 28 25 551 C3 | 12/1996 | Germany | F16C 32/04 |
| 196 37 598 A1 | 4/1998 | Germany | F16C 32/06 |

*Primary Examiner*—Elvin Enad
*Assistant Examiner*—Burton S. Mullins
*Attorney, Agent, or Firm*—Kennedy Covington Lobdell & Hickman, LLP

[57] ABSTRACT

A bearing for the shaft of a spinning rotor of an open-end spinning machine, wherein the shaft is magnetically supported axially and radially without contact by two axially spaced-apart magnet pairs on the shaft and stator housing in dispositions rotationally symmetrical to the axis of the rotor. The magnet pairs have nonidentical magnet poles facing one another and an electromagnetic center position regulator is provided to maintain an axial center position.

15 Claims, 9 Drawing Sheets

BEARING ASSEMBLY FOR AN OPEN-END SPINNING MACHINE

FIELD OF THE INVENTION

The present invention relates to a bearing assembly for an open-end spinning machine.

BACKGROUND OF THE INVENTION

In the continued development of open-end spinning machines, it is important not only to improve the quality of the yarns produced, but also to reduce the expense for constructing such machines and to make their operation safer.

In this regard, a particularly definitive factor in spinning machines is the bearing of the rotor and the rotor drive mechanism. For this reason, over the years, various forms of drive mechanisms and bearings for spinning rotors have been developed.

In order to minimize bearing friction in high-speed spinning rotors, which often markedly exceed 100,000 rpm in speed, efforts are directed to supporting these rotors contactlessly at least partly.

One such apparatus for open-end spinning is known for instance from German Patent Disclosure DE 196 42 471. This reference describes an open-end spinning machine whose rotor has an individual drive mechanism and is axially supported in contactless fashion. The axial bearing is effected either by permanent magnets or aerostatically or by a combination of the two. The bearing in the radial direction is accomplished in the conventional principle by supporting in the nip of a support disk bearing. In addition, a contact pressure disk for securing the rotor bearing in the bearing gap is also in existence.

A disadvantage here is that the radial rotor support in support disks with a contact-pressure disk causes friction losses, particularly with a view to a possibly restricted installation position for the axes, at least of the support disks. Another disadvantage is that the additional structural expense for this apparatus for the use of a radially acting support disk arrangement with a contact- pressure disk is not inconsiderable.

A completely contactless bearing assembly for open-end spinning machines has been disclosed for instance by German Patent Disclosure DE 2 412 174. In this reference, the spinning rotor, otherwise driven by an individual motor, is supported both axially and radially with gas or air bearings. A disadvantage of this arrangement is that, by using an air bearing, there is increased expense for construction, maintenance, and furnishing the air, in view of the sensitivity of aerostatic or aerodynamic bearing systems. Another disadvantage is that, if the bearing energy fails, the rotor is unbraked and can run up, with its axial direction undefined, against the stator.

OBJECT AND SUMMARY OF THE INVENTION

In view of the known bearing assemblies for open-end spinning machines of the type described above, an object of the present invention is to improve such bearing assemblies so as to overcome or avoid the disadvantages thereof.

This object is attained according to the present invention by a bearing for a shaft of a spinning rotor of an open-end spinning machine, basically comprising two axially spaced-apart pairs of magnets which function as magnet bearing components. One magnet of each pair of magnets is disposed on the shaft and the other magnet of each pair of magnets is disposed stationarily with respect to the stator housing in respective dispositions rotationally symmetrically to the axis of the rotor. In this manner, the magnet pairs serve to magnetically support the shaft both axially and radially without contact therewith. The magnets of each pair of magnets have nonidentical magnet poles facing one another, and an electromagnetic center position regulator is provided to maintain an axial center position. The invention has the particular advantage that it is kept simple in terms of its overall design. Another advantage is that friction is virtually negligible, thus making for energy economy, because the magnetic bearing acts both radially and axially.

The magnetic bearing in a preferred embodiment has stator (i.e., stationary) magnet components axially located inwardly of the other respective magnets of the magnet pairs, which enables a very compact design. Furthermore, the stator magnets have almost no impeding contours in the region of the rotor cup or of the face end of the rotor shaft.

By suitable delivery of current to at least one bearing coil, it is attained that the rotor is in axial equilibrium of force in spinning operation, i.e., the rotor floats with respect to the stator magnets of the magnet bearing components.

The magnet bearing is preferably designed asymmetrically with regard to the forces acting on the rotor in the event of an energy failure. As a result, a preferential direction of movement of the spinning rotor is predetermined if there is an energy failure. It is accordingly advantageous that, for axially intercepting the spinning rotor, which is an absolute requirement if a controlled rundown of the rotor rpm is to be achieved, only a single axial interception bearing is necessary. This axial interception bearing is located on the end of the rotor shaft, for instance, and has an only slight three-dimensional extent. Furthermore, the interception bearing itself can be of a simple design and therefore can be made economically.

To provide the advantage of high operating safety of the spinning assembly if the bearing energy fails, the rotor is forced into a defined axial direction by the unequal permanent magnetic forces of the magnet bearing. Since during the spinning process, the center position of the rotor is set by adjustment and retained with a special regulator, the differing magnetic design of the bearing components in rated operation compensates for both positive and negative acceleration of the spinning rotor.

As an alternative, an electric circuit may be used to impose a preferential direction of axial movement in the event of an energy failure by means of a suitable, defined delivery of current to at least one of the bearing coils associated with the magnet pairs. An advantage in this case is that the magnet bearing components are embodied identically, and thus the energy needed to keep the rotor in its center position can be kept low.

A capacitor may be advantageously used as a source for supplying current to the coil. The advantage of using a capacitor is its low cost and the exponential discharge curve typical of capacitors. Such a discharge curve leads to a spontaneous current rise in the coil and thus to a direct influence on the axial rotor position.

As an alternative energy source, a battery may be used for supplying current to the coil to initiate a predetermined preferential direction of movement of the spinning rotor. The use of a battery has the advantage among others that such a current source can be used multiple times in succession without recharging in the meantime as is needed with a capacitor.

As a further option for supplying current to the magnet coils of the spinning rotor bearings in the event of an energy failure, the interconnection of the various magnet coils with the individual drive mechanisms of the rotors is contemplated. If there is an energy loss in the supply network, the individual drive mechanisms as they run down can generate energy in a generator mode that may be used for a defined delivery of current to the appropriate magnet bearing coil. The advantage of such an arrangement is, on the one hand, that no additional energy source is needed, and, on the other hand, that the generator mode leads to a not inconsiderable braking of the individual drive mechanisms as they come to a stop. The spinning rotors therefore, if they come into contact with their axial interception bearings, already run at a considerably reduced rpm, which has a favorable effect on the service life of both the rotors and the interception bearings.

The aforementioned electric circuit should logically be designed in such a way that by means of suitable components, it is possible to detect the current feed voltage value and compare it with a defined minimum voltage value. If an overly low voltage is detected, the conclusion is drawn that an energy failure has occurred, and the applicable magnet coil receives current in accordance with the energy source used. It is advantageous here that the emergency current circuit is not permanently integrated with the current flow during normal spinning operation, so that the emergency current sources and the associated components are not constantly under load.

Preferably, the axial interception bearing is provided with an adjustment capability for a degree of axial play in the bearing, i.e., a predetermined axial spacing from the rotor; as a result, production variations can be compensated for, and an optimal bearing play can be set. A greater bearing play for instance moves the rotor farther from the bearing magnet which would attract it in the wrong direction. That is, a greater bearing play leads to a more stable axial fixation of the spinning rotor if the energy has failed or been turned off. A slight bearing play has the advantage that the acceleration path of the spinning rotor in the case of an energy loss is relatively short, and therefore the spinning rotor does not strike the axial interception bearing as hard.

Different suitable alternative embodiments of the supporting element of the axial interception bearing are contemplated. For example, a support ball may be used as part of the axial interception bearing, whose advantage is that the area of the bearing face on the spinning rotor shaft is always the same, even if the shaft is canted. As an alternative, the supporting element may be in the form of a pointed support tip, which has the advantage of always being in accurate point contact.

Further details, features and advantages of the present invention will be understood from the exemplary embodiments described below and shown in the drawings.

DESCRIPTION OF THE PREFERRED EMBODIMENTS

Figure 1:
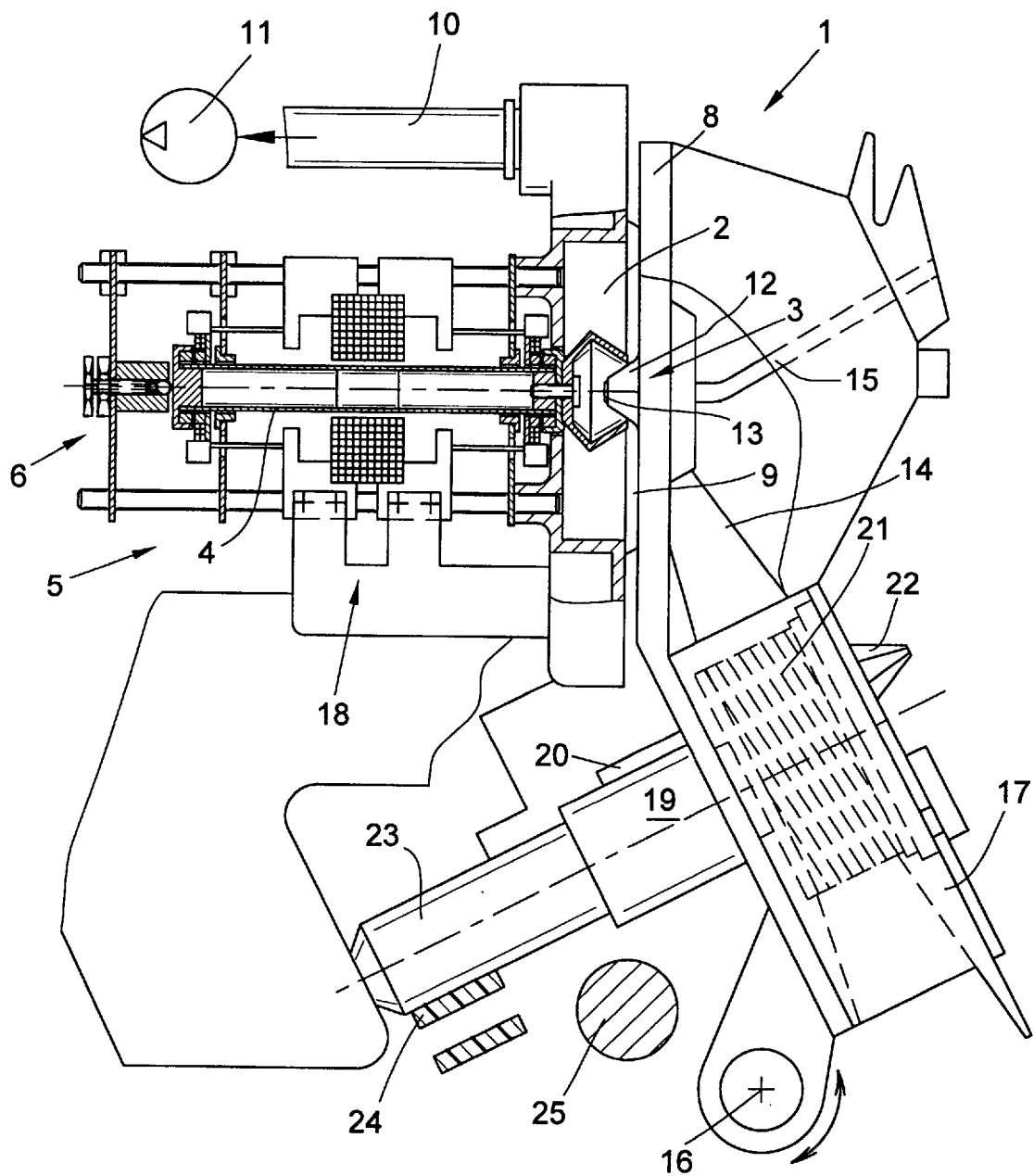
FIG. 1 is a side view, partly in section, showing an open-end spinning machine with a contactless, passive spinning rotor bearing and an interception bearing disposed on the end of the rotor shaft, in accordance with the present invention.

Referring now to the accompanying drawings and initially to FIG. 1, an open-end spinning machine is shown and is identified overall by reference numeral 1.

As is known, the open-end spinning machine 1 in usual manner has a rotor housing 2, in which the spinning cup of a spinning rotor 3 revolves at high speed (rpm). The spinning rotor 3 is driven by an electric individual drive mechanism 18 and is fixed by its rotor shaft 4 in the magnet bearing components 32, 33, 34; 42, 43, 44 of a magnet bearing 5, which supports the spinning rotor 3 both radially and axially.

As usual, the rotor housing 2 is open toward the front of the machine and is closed during operation by a pivotably supported cover or cap element 8, and a channel plate (not identified by reference numeral) with a seal 9 fitted into the cap element. The rotor housing 2 is also connected, via a suitable suction line 10, to a negative-pressure source that generates the negative pressure required for spinning in the rotor housing 2.

A channel plate adapter 12 is disposed in the cap element 8 or in the channel plate and has both the yarn draw-off nozzle 13 and the orifice region of the fiber guide channel 14. The yarn drawoff nozzle 13 is adjoined by a yarn drawoff tubule 15.

The cap element 8 is rotatably supported to a limited extent about a pivot axis 16 and includes an opening roller housing 17. The cap element 8 also has bearing brackets 19, 20 on its back for supporting an opening roller 21 and a sliver introduction cylinder 22, respectively. The opening roller 21 is driven in the region of its wharve 23 by a traveling endless tangential belt 24 which extends the same length as the machine, while the drive (not shown) of the sliver introduction cylinder 22 is preferably effected via a worm gear assembly that is connected to a drive shaft 25 similarly extending the same length as the machine.

Figure 2:
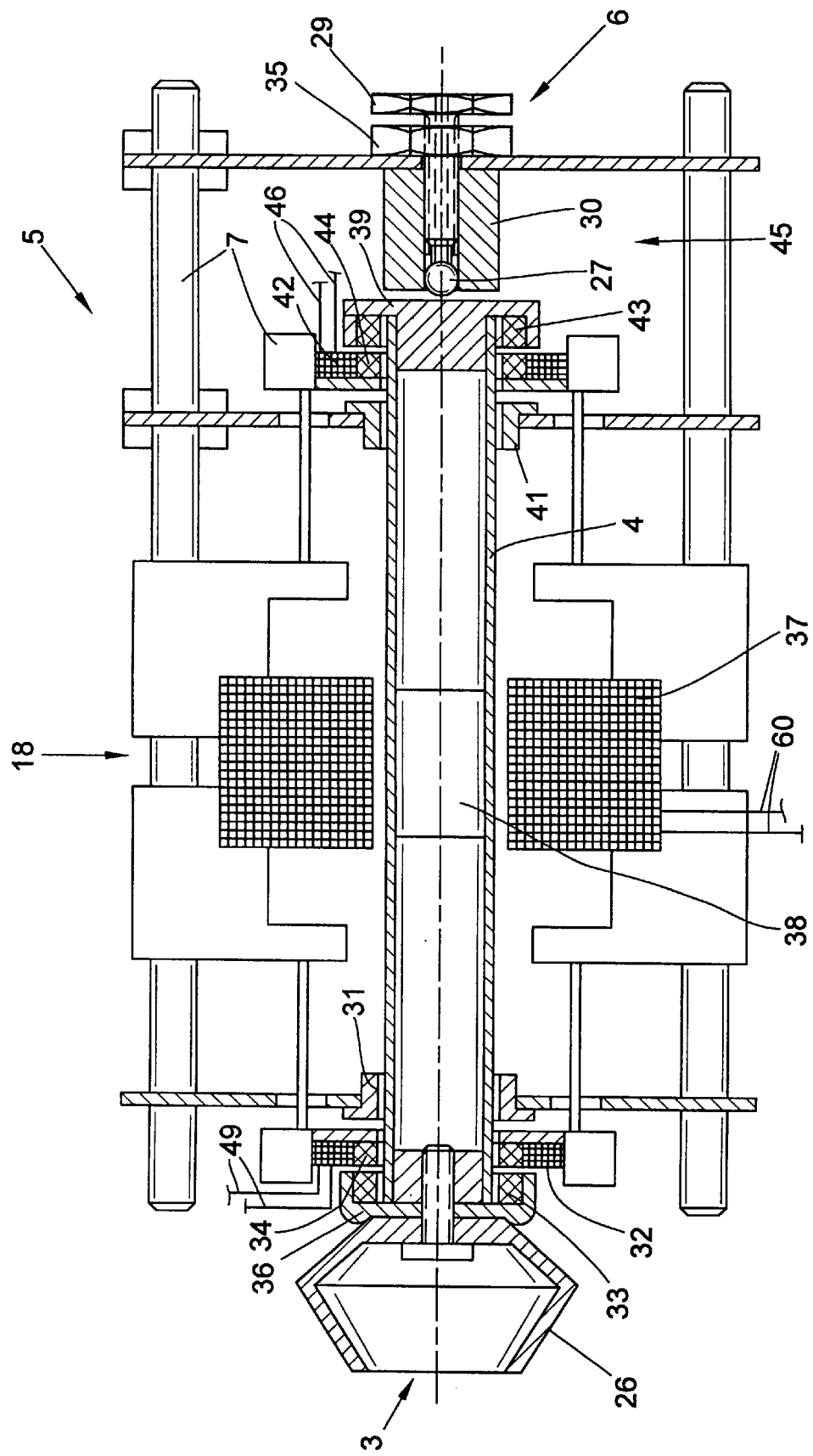
FIG. 2 is a more enlarged side view, also partially in section, of the spinning rotor bearing of FIG. 1.

In accordance with the present invention, the open-end spinning unit 1 includes a magnet bearing 5 with an axial interception bearing 45, one possible embodiment of which is shown in FIG. 1 and on a more enlarged scale in FIG. 2. The structural form of the magnet bearing 5 shown is predetermined at least in part by the individual drive mechanism 18 used, along with its motor magnets 38 and its motor coil 37.

Limiter bearings 31 and 41 are fixed to the stator housing 7 and represent radial end stops for the rotor shaft 4. That is, the limiter bearings 31, 41 prevent the spinning rotor 3, if vibration occurs or there is an energy failure, from running up against the magnet bearing components 32, 34; 42, 44. Also mounted on the stator are the nonrotating components of the magnet bearing 5, specifically the magnet bearing coils 32 and 42 with their leads 49 and 46 and the bearing magnets 34 and 44. Facing them a slight distance away are the bearing magnets 33 and 43 of the rotor. The front bearing magnet 33 of the rotor is enclosed by a rotor cup receptacle 36, and the rear bearing magnet 43 of the rotor is disposed in a similar bearing cap 39. The bearing cap 39 and the rotor cup receptacle 36 are each mounted to the face end of the rotor shaft 4. The rotor cup 26 is disposed on the rotor cup receptacle 36.

The axial interception bearing, identified overall by reference numeral 45, is located in the rear region of the magnet bearing 5. In detail, the axial interception bearing comprises a support ball 27 and an adjustment device 6. The adjustment device in turn comprises a screw block 30, which rests on the stator 7, a setting screw 29; and a lock nut 35, for fixing the setting of the adjustment device 6.

Figure 3:
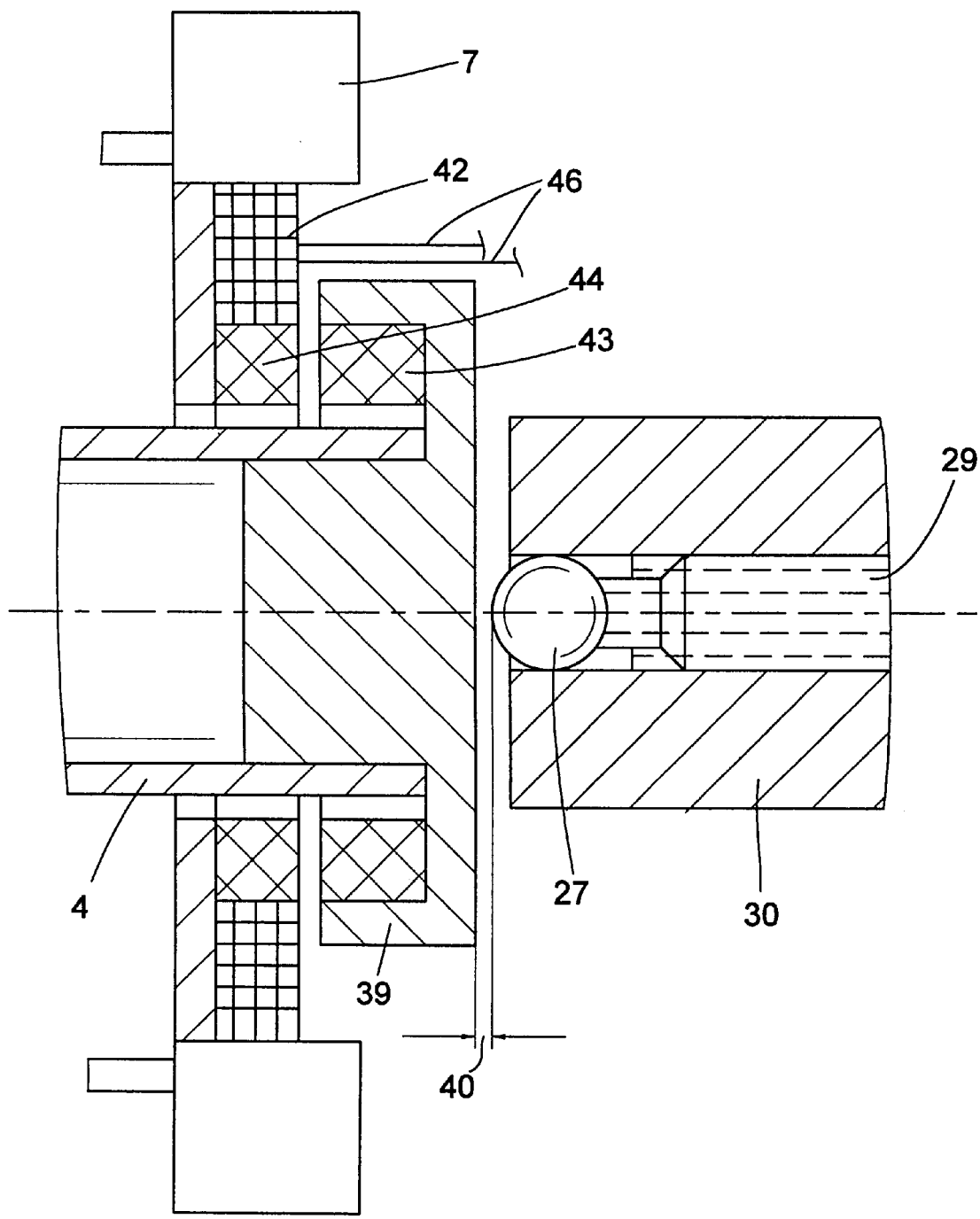
FIG. 3 is a still further enlarged side view, also partially in section, of the magnetic spinning rotor bearing of FIG. 1 showing the axial interception bearing during the spinning process.

In a further view in FIG. 3, the end region of the magnet bearing 5 already shown in FIG. 2 can be seen. On a larger scale, the screw block 30 and the setting screw 29 can be seen here, among other elements. With the above-described adjustment device 6 of the axial interception bearing 45, a degree of axial interception play 40 can be selectively established in the bearing. Specifically, the axial interception bearing play 40 defines a spacing, when the magnet bearing 5 is switched on, between the rear bearing cap 39 and the support ball 27.

The end region of the rotor shaft 4 with the bearing cap 39 mounted on its end and with the rear bearing magnet 43 disposed in the cap can also be seen. In addition, the rear bearing magnet 43 and the rear bearing coil 42 with their leads 46 for supplying current can be seen mounted on the stator 7.

Figure 4:
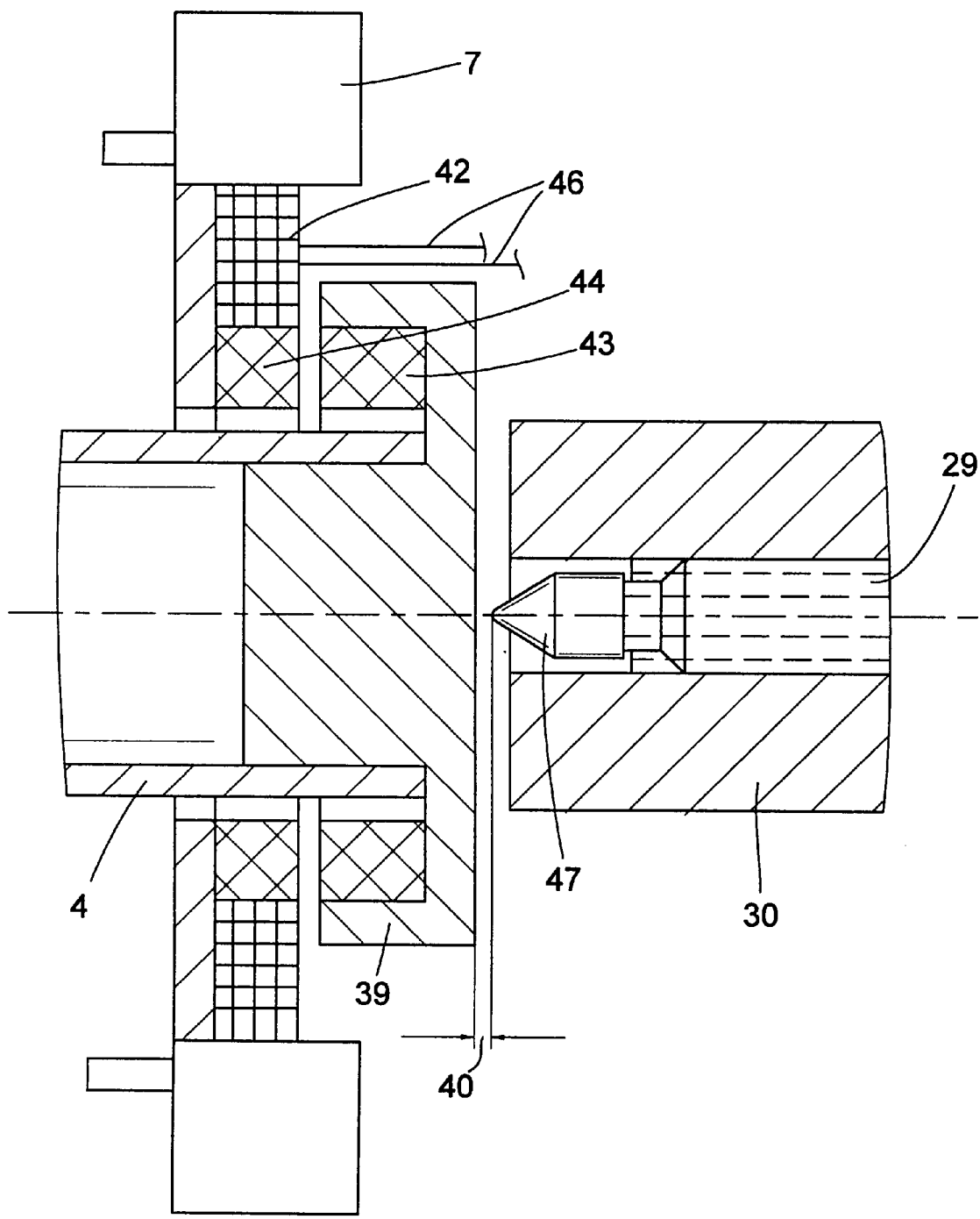
FIG. 4 is another enlarged side view, partially in section, similar to FIG. 3 depicting the end region of a magnetic spinning rotor bearing with an axial interception bearing according to an alternative embodiment of the axial interception bearing, also shown during the spinning process.

FIG. 4 shows an alternative embodiment of the end region of the magnet bearing 5. The axial interception bearing differs from the embodiment shown in FIG. 3, among other ways, in the type of support element. Instead of the support ball 27 shown in FIG. 3, a conical support tip 47 is used. The pointed support tip 47 can be an individual component, or as suggested in FIG. 4 may be a pointed tip formed integrally onto a setting screw 29.

Figure 5:
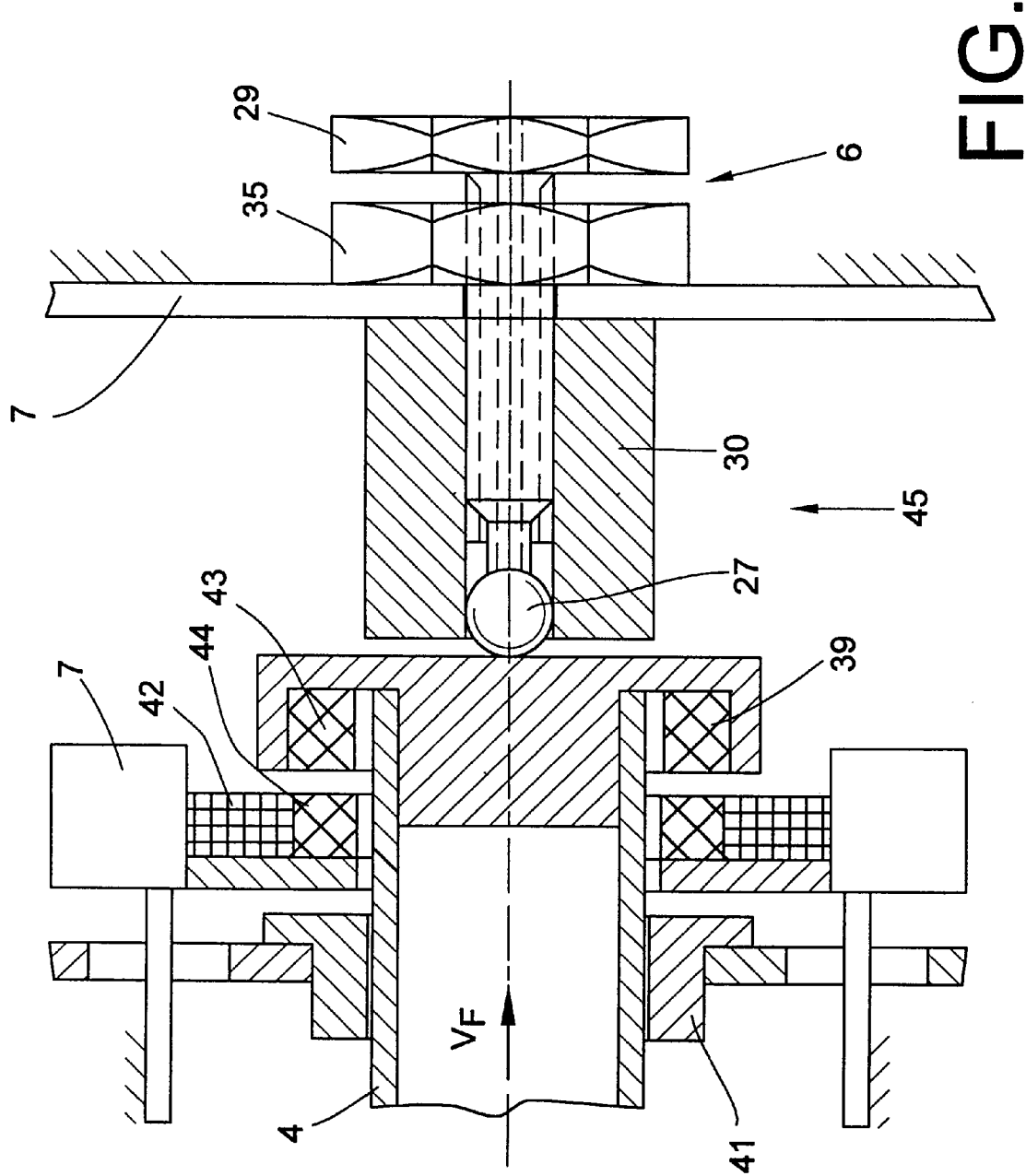
FIG. 5 is an enlarged side view, partially in section, of the spinning rotor bearing of FIG. 3 depicting the event of an energy failure.

FIG. 5 depicts the end region of a magnet bearing 5 which is turned-off or without energy, e.g. when the spinning machine is not in operation. The rotor shaft 4 of the spinning rotor 3 rests on its axial interception bearing 45. The spinning rotor 3 has drifted away in its preferential direction of axial movement $V_F$, in this case away from the spinning side, and rests on the support ball 27 of the axial interception bearing 45.

As explained above, if there is an energy failure, the spinning rotor 3 slides away in the preferential direction of axial movement $V_F$ because of suitable provisions to be explained later and after overcoming the axial interception bearing play 40 comes to rest on the support ball 27 of the axial interception bearing 45. The axial interception bearing play 40 can be set to the desired magnitude by means of the adjustment device 6.

Figure 6:
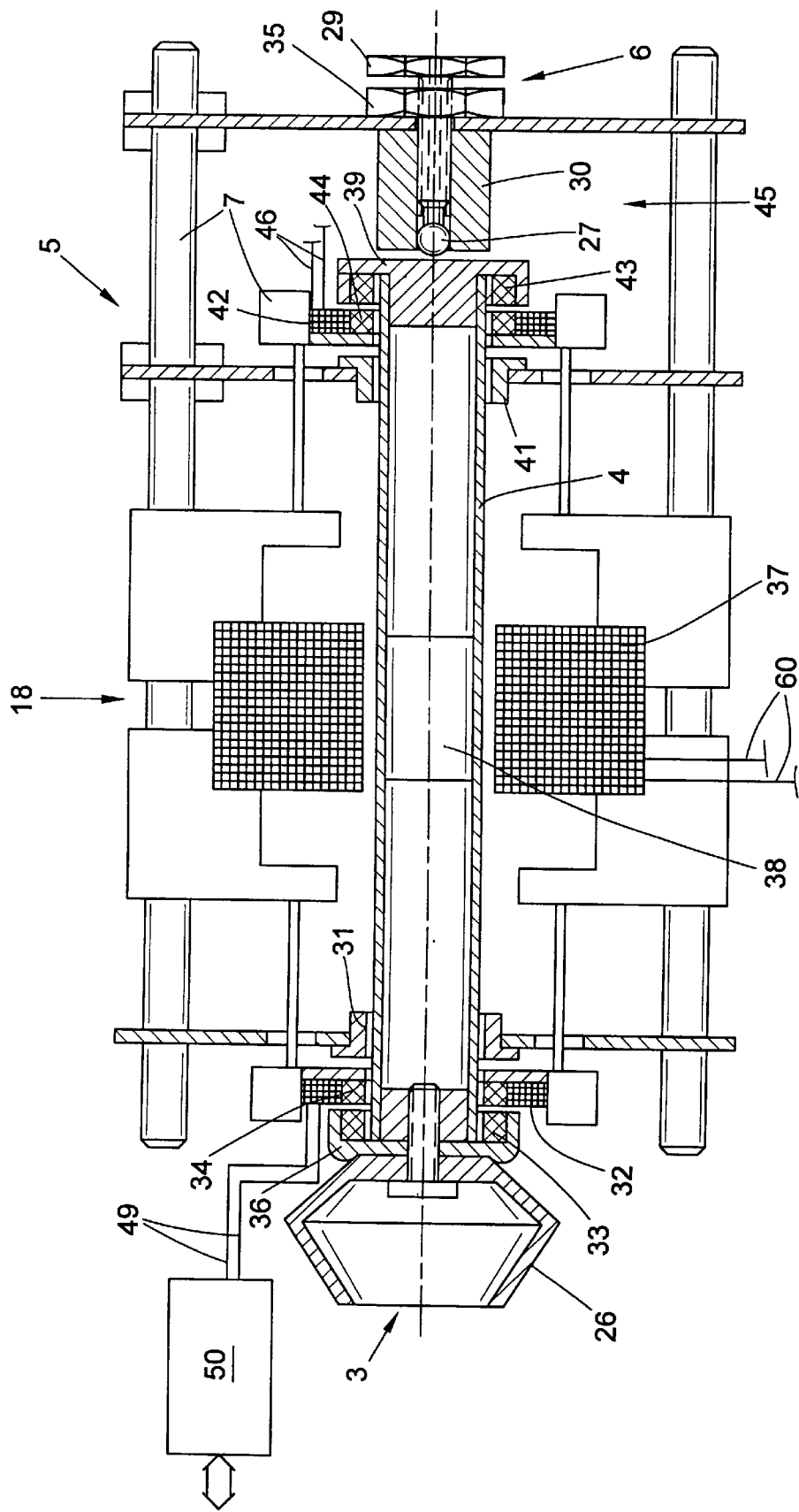
FIG. 6 is a side view, partially in section, of the spinning rotor bearing of FIG. 2, with an associated electric circuit shown only representatively.

FIG. 6 shows a magnet bearing 5 whose magnet bearing coils 32 and/or 42 can be supplied with a defined current via an electric circuit 50. The electric circuit 50 for triggering at least one of the bearing coils 32 and 42 (in this case, the front bearing coil 32), and thus for imposing the preferential direction of axial movement $V_F$, is shown symbolically as a "black box". The electric circuit 50 is connected to the bearing coil 32 via the leads 49.

Figure 7A:
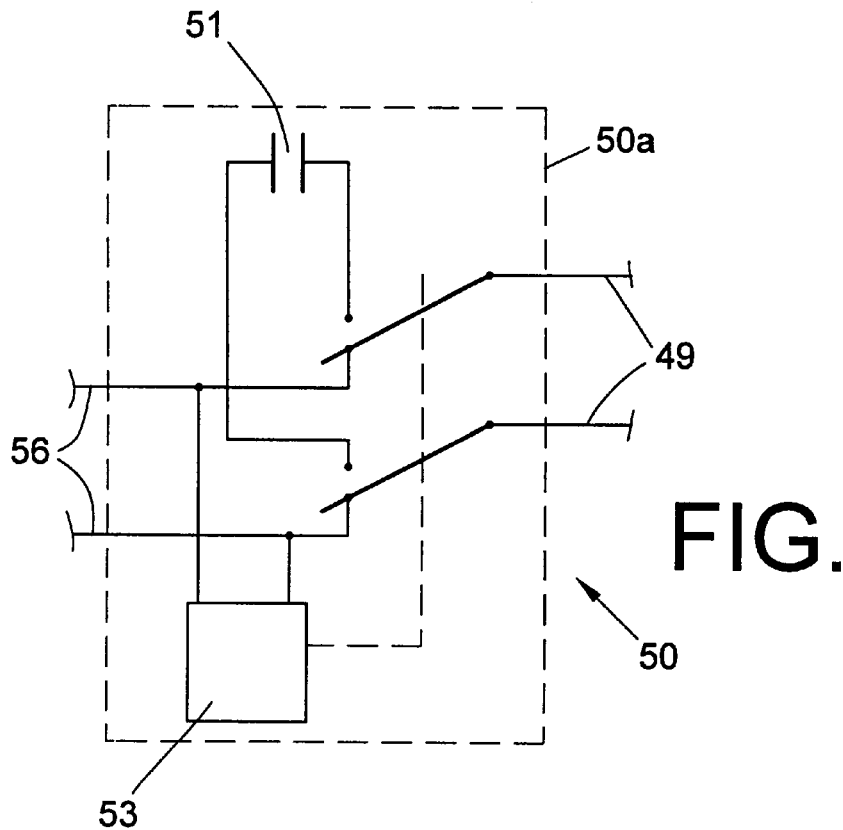
FIGS. 7a–d show examples of proposed circuit designs for the electric circuit of FIG. 6.

FIGS. 7a–7d show an overview of possible examples of designs of the electric circuit 50. FIG. 7a shows an electric circuit 50a which uses a capacitor 51 for briefly supplying current to the front bearing coil 32 if there is an energy drop. The connection lines 56 serve to supply current to the bearing coil 32 during spinning operation. If there is an energy drop, an electrical low-voltage monitor 53 connected to the system detects the energy loss and via switches closes an emergency current circuit into which the capacitor 51 is integrated. The emergency current circuit is then connected to the leads 49, and as a result the outflowing current of the capacitor 51 supplies the bearing coil 32 and thus presses the spinning rotor 3 in a preferential direction of axial movement $V_F$ (away from the open side of the spinning cup).

Figure 7B:
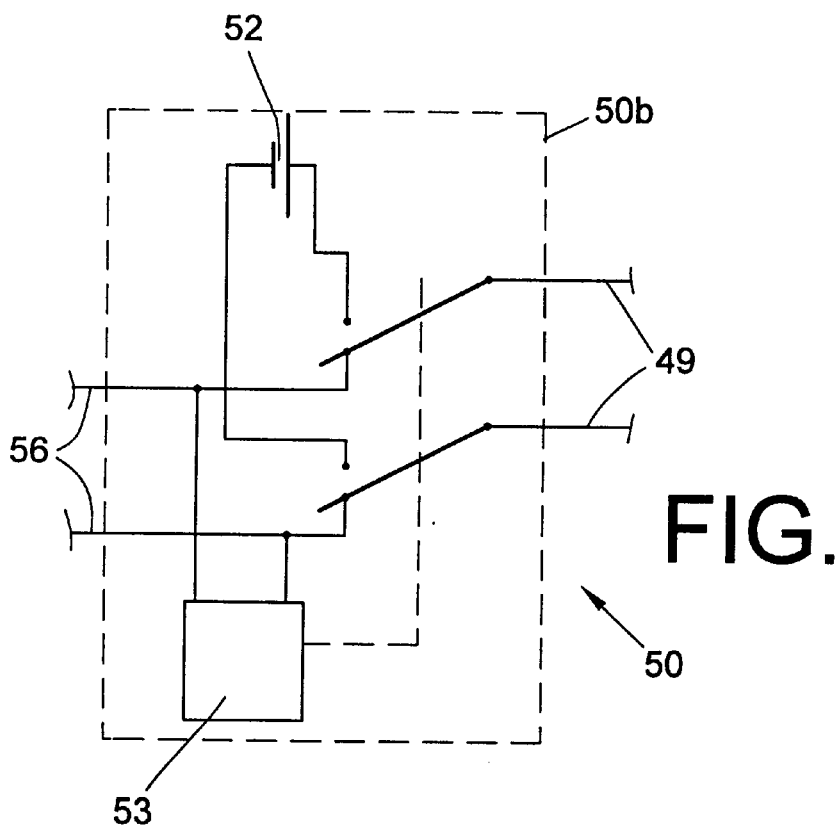

In FIG. 7b, a circuit 50b is illustrated which is comparable in principle. However, instead of a capacitor, a battery 52 is used. The use of a battery 52 has the advantage that recharging need not be done repeatedly as would be necessary if the capacitor 51 were used.

Figure 7C:
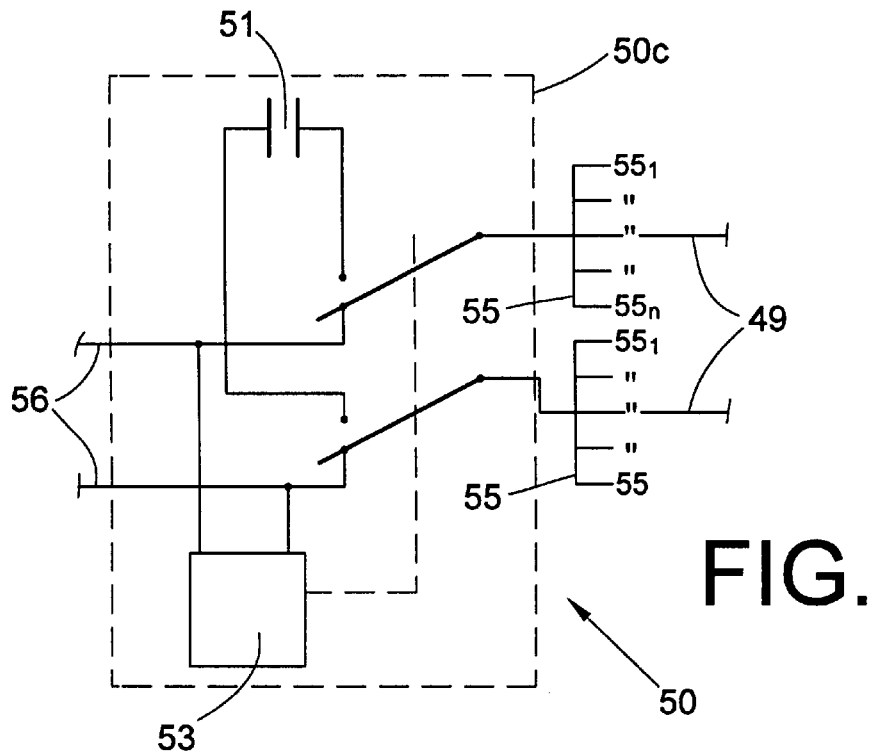

In FIG. 7c, a circuit 50c is shown wherein the cross-linking of a plurality of spinning stations (1–n) into a composite is provided. The function of the circuit 50c is analogous to the circuit 50b described for the exemplary embodiment in FIG. 7b, but is different in the disposition of the battery 52 and the electric low-current monitor 53 at a central location. Connecting a plurality of magnet bearings 5 is done via the distributors 55, from which the emergency current circuit is connected to the leads 49, and as a result the outflowing current of the battery 52 supplies the respective bearing coils 32 and thus presses the spinning rotors 3 in one direction (away from the open sides of the spinning cups). An advantage here is the more-economical design by using the battery 52 and the electric low-voltage monitor 53 for n magnet bearings.

Figure 7D:
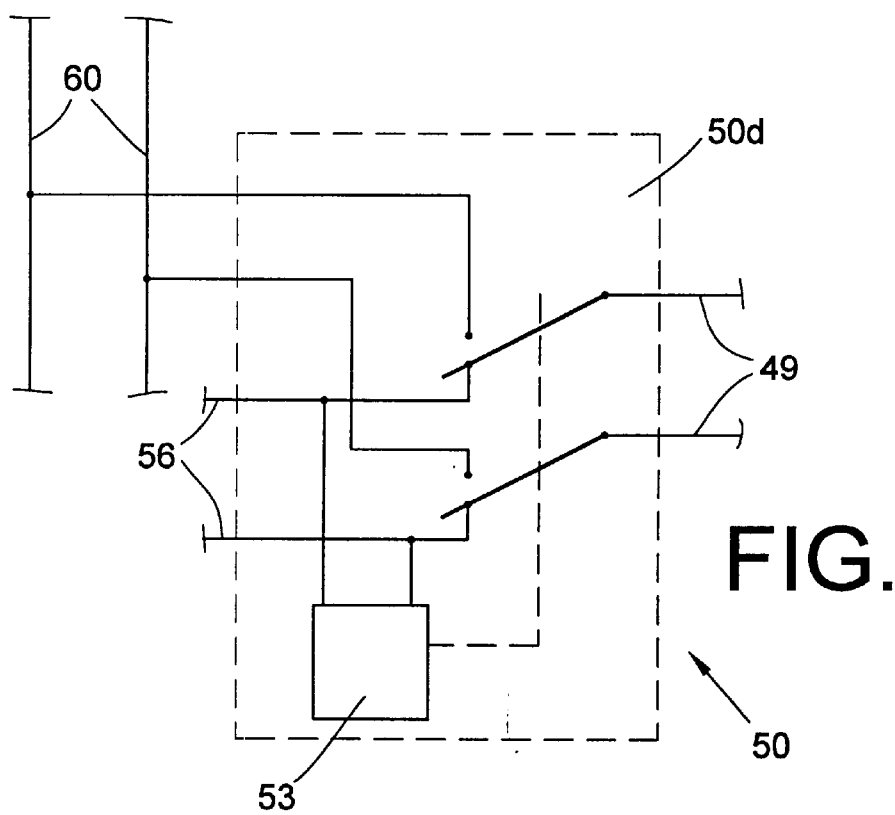

In FIG. 7d, a design of an electric circuit 50d is shown which, like the arrangements already described above, has an electric low-voltage monitor 53, but which uses a different energy source to supply the emergency current circuit. As the energy source here, the energy from the leads 60 of the motor is used; the motor in the generator mode generates this energy as it runs down. The diverted energy, by supplying current to the bearing coil 32, causes the spinning rotor 3 to migrate in its preferred direction.

Figure 8:
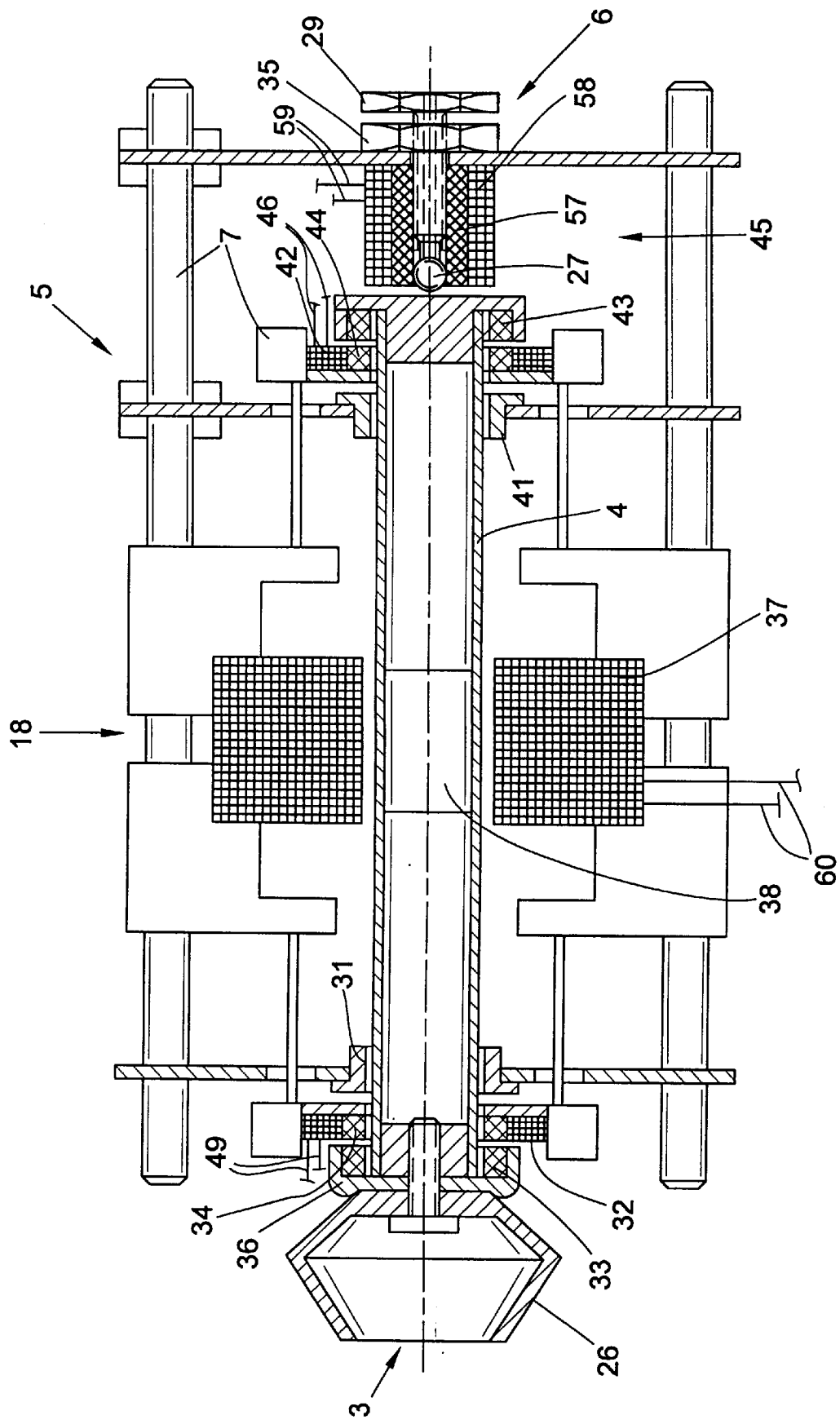
FIG. 8 is a side view, partially in section, of the spinning rotor bearing of FIG. 2, with a magnetic axial interception bearing.

FIG. 8 shows an advantageous design of the invention in the form of a magnetic axial interception bearing 45. A distinction from a version according to FIG. 2 is that, instead of the screw block 30, an axial interception bearing magnet 57 is used here, with an axial interception bearing coil 58 surrounding it. By permanently supplying current to the axial interception bearing coil 58 through the leads 59 during normal spinning operation, the magnetic action of the axial interception bearing magnet 57 is fully compensated for. If the energy fails, the axial interception bearing coil 58 no longer receives current, either, and the magnetic forces of the axial interception bearing magnet 57 are no longer compensated for. The axial interception bearing magnet 57 then attracts the rotor to itself with a magnetic force that also acts on the ferrometallic components of the spinning rotor 3, thus creating a preferred drop direction $V_F$.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. A bearing for a shaft of a spinning rotor of an open-end spinning machine, comprising;
   (a) two axially spaced-apart pairs of magnets, one magnet of each pair of magnets disposed on the shaft and the other magnet of each pair of magnets disposed on a stator housing of the open-end spinning machine, each magnet of each pair of magnets being disposed in respective dispositions rotationally symmetrical to the axis of the rotor shaft, said pair of magnets magnetically supporting the rotor shaft both axially and radially without contact therewith, the magnets of each pair of magnets having nonidentical magnet poles facing one another,
   (b) an electromagnetic center position regulator for maintaining an axial center position of the rotor shaft during operation of the open-end spinning
   (c) an axial interception bearing disposed at an end of the rotor shaft for engagement therewith in the event of an energy failure of the open-end spinning machine.

2. The bearing assembly of claim 1, wherein the axially spaced-apart pairs of magnets are arranged to exert magnetic forces, in the event of an energy failure of the open-end spinning machine, to urge a preferential movement of the rotor shaft axially in the direction of the axial interception bearing for engagement therewith.

3. The bearing assembly of claim 2, wherein each respective pair of magnets include two permanent magnets having unequal permanent magnetic forces for urging the preferential movement of the rotor shaft in the event of an energy failure of the open-end spinning machine.

4. The bearing assembly of claim 1, wherein the electromagnetic center position regulator exerts magnetic forces, in the event of an energy failure of the open-end spinning machine, to urge preferential movement of the rotor shaft axially in the direction of the axial interception bearing for engagement therewith.

5. The bearing assembly of claim 1, wherein the electromagnetic center position regulator includes at least one coil disposed about the rotor shaft adjacent one of the magnets.

6. The bearing assembly of claim 1, wherein the axial interception bearing includes an adjustment device for selective setting of a defined spacing of the axial interception bearing from the spinning rotor.

7. The bearing assembly of claim 1, wherein the axial interception bearing includes a supporting element comprising a support ball.

8. The bearing assembly of claim 1, wherein the axial interception bearing includes a supporting element comprising a pointed support tip.

9. The bearing assembly of claim 1, wherein the axial interception bearing comprises an axial interception bearing magnet, an axial interception bearing coil, and an electric circuit that supplies electrical energy to the axial interception bearing coil during normal operation of the open-end spinning machine but discontinues electrical energy to the axial interception bearing coil during an energy failure of the open-end spinning machine such that the axial interception bearing magnet urges the rotor shaft toward engagement with the axial interception bearing.

10. A bearing for a shaft of a spinning rotor of an open-end spinning machine, comprising:
    (a) two axially spaced-apart pairs of magnets, one magnet of each pair of magnets disposed on the shaft and the other magnet of each pair of magnets disposed on a stator housing of the open-end spinning machine, each magnet of each pair of magnets being disposed in respective dispositions rotationally symmetrical to the axis of the rotor shaft, said pair of magnets magnetically supporting the rotor shaft both axially and radially without contact therewith, the magnets of each pair of magnets having nonidentical magnet poles facing one another, and
    (b) an electromagnetic center position regulator for maintaining an axial center position of the rotor shaft during operation of the open-end spinning machine, including an electric circuit for controlling delivery of electrical energy to at least one coil disposed adjacent a said magnet in the event of an energy failure of the open-end spinning machine to induce a preferential axial movement of the spinning rotor.

11. The bearing assembly of claim 10, wherein the electric circuit includes a capacitor connected via leads to the at least one coil.

12. The bearing assembly of claim 10, wherein the electric circuit includes a battery connected via leads to the at least one coil.

13. The bearing assembly of claim 10, further comprising an individual drive mechanism for operating the spinning rotor and connected to the electric circuit for supplying electrical power to the electric circuit during slowdown of the individual drive mechanism during an energy failure of the open-end spinning machine, the individual drive mechanism delivering current to the at least one coil for the preferential axial movement of the spinning rotor during said slowdown.

14. The bearing assembly of claim 10, wherein the electric circuit includes means to detect an actual voltage value and perform a comparison thereof with a minimum voltage value, and to actuate the electric circuit to deliver electrical energy to the at least one coil to initiate the preferential axial movement of the spinning rotor in the event the minimum voltage value is not attained.

15. A method for supporting a shaft of a spinning rotor of an open-end spinning machine, comprising the steps of:
    (a) supporting the rotor shaft both axially and radially with two axially spaced-apart pairs of magnets, one magnet of each pair of magnets disposed on the shaft and the other magnet of each pair of magnets disposed on a stator housing of the open-end spinning machine, each magnet of each pair of magnets being disposed in respective dispositions rotationally symmetrical to the axis of the rotor shaft;
    (b) maintaining with an electromagnetic center position regulator an axial center position of the rotor shaft during operation of the open-end spinning machine; and
    (c) urging the rotor shaft into engagement with an axial interception bearing disposed at an end of the rotor shaft during an energy failure of the open-end spinning machine.

* * * * *